UNITED STATES PATENT OFFICE.

HENRY A. GARDNER, OF WASHINGTON, DISTRICT OF COLUMBIA.

COMPOSITION OF MATTER AND METHOD OF PREPARING SAME.

1,086,361.

Specification of Letters Patent.

Patented Feb. 10, 1914.

No Drawing.

Application filed October 17, 1912. Serial No. 726,355.

*To all whom it may concern:*

Be it known that I, HENRY A. GARDNER, a citizen of the United States, residing at Washington, in the District of Columbia, have invented certain new and useful Improvements in Composition of Matter and Method of Preparing Same, of which the following is a specification.

This invention relates to the preparation of resilient and elastic masses or bodies from the so-called Chinese wood oil or tung oil of commerce, hereinafter referred to as "wood-oil."

It is well understood in the arts that wood-oil undergoes polymerization when subjected to high temperatures for a sufficient time, yielding a solid polymerized product which is insoluble in all ordinary paint and varnish solvents, as well as in dilute acids and alkalis. It has heretofore been proposed to produce this polymerized product as a filling for porous bodies, or as a film for coating metals and the like. If the raw wood-oil be heated in presence of basic compounds, such as the oxids of lead, the above-described polymerization does not occur, but there are formed instead products (tungates) which are soluble in various solvents, including boiling linseed oil.

I have discovered that if the wood-oil be heated to a temperature sufficient for polymerization in presence of certain finely-divided materials which are insoluble in the oil and incapable of entering, at least to any substantial degree, into chemical combination therewith, products possessing entirely new properties and characteristics may be formed. The new products, like the known polymerized oil, are substantially insoluble in all ordinary paint and varnish solvents, including boiling linseed oil. In physical character they are entirely different from the products of direct polymerization above referred to, particularly in that they exhibit a high degree of resilience and elasticity, and are not agglomerated by simple pressure. These new products are characterized by the presence of the filling material, distributed therethrough and inseparable therefrom by processes not involving the destruction of the composition. The new products are substantially non-oxidizable and are susceptible of many uses in the ares, such as fillers for motor-vehicle tires, as components of linoleum and rubber compositions and other plastics, etc.

The physical characteristics of the product may vary somewhat with the details of treatment and the proportion and character of the components. Typical illustrative examples of their preparation are as follows, it being understood that the invention is not restricted to the proportions or the details of manipulation given:

(1) 200 parts by weight of wood-oil are heated to 250° C., and there is added to the oil and thoroughly incorporated therewith by stirring, 50 parts of lithopone. The temperature is then raised to 280° or 290° C., and held at this point for about ten minutes, after which the mass is permitted to cool. The product is a highly resilient and elastic mass possessing the distinctive characteristics above set forth.

(2) Similar proportions and temperatures are used, but the mass is maintained at the higher temperature, 280° to 290° C., for 30 minutes or until a brown color appears on the surface. The process is aided by introducing a jet of air into the body of oil immediately after the addition of the filling material, the introduction of air being continued until the mass stiffens by polymerization. The air serves the purpose of maintaining the filling material in suspension until polymerization of the oil sets in. The polymerized mass may then be subdivided or granulated, converting it into detached or semi-detached particles, in which form it is best suited for certain purposes.

The times and temperatures above noted are to some degree correlative, inasmuch as similar results may be obtained by longer treatment at lower temperatures.

Instead of lithopone, I may use other substances of mineral origin which are substantially insoluble in the oil and incapable of chemical reaction therewith, suitable materials being baryta, china clay, silica, ground talc, calcium sulfate, and the like, used preferably with a small percentage of lithopone.

The proportion of filling substance may be varied materially according to the intended use of the product, the preferred proportion for most purposes being from 20 to 30 per cent. by weight of the wood-oil.

While the reasons for the modification in the character of the product due to the presence therein of the finely-divided and minutely disseminated filling material, are not definitely known, it is apparently essential to the development of the desired properties that the filling material should be distributed through the mass in very finely subdivided or powdered form; for like results are not obtained by impregnating porous or absorbent bodies with the oil and then subjecting the latter to polymerization. In other words, it appears to be essential that the structure of the granule, particle or mass should be essentially that of the polymerized oil carrying discrete particles disseminated through it, rather than that the structure should be that of a coherent, porous body, the pores of which are filled with polymerized product.

I claim:

1. The method of making resilient or elastic masses from wood-oil, which consists in polymerizing the oil while maintaining a finely-divided insoluble filling material in suspension therein, and converting it thereby into a polymerized product which is insoluble in all ordinary oil and varnish solvents.

2. The method of making resilient or elastic masses from wood-oil, which consists in polymerizing the oil while maintaining a finely-divided insoluble filling material in suspension therein, converting it thereby into a polymerized product which is insoluble in all ordinary oil and varnish solvents and granulating the polymerized product.

3. As a new composition of matter, an elastic and resilient mass consisting essentially of insoluble solid polymerized wood-oil having an insoluble inorganic filling material inseparably incorporated therewith and disseminated therethrough in the form of minute particles.

4. As a new composition of matter, an elastic and resilient granular mass consisting essentially of insoluble solid polymerized wood-oil having an insoluble inorganic filling material, inseparably incorporated therewith and disseminated therethrough in the form of minute particles.

In testimony whereof I affix my signature in presence of two witnesses.

HENRY A. GARDNER.

Witnesses:
J. H. BRICKENSTEIN,
C. W. FOWLER.